United States Patent
Zhang et al.

(10) Patent No.: US 8,964,027 B2
(45) Date of Patent: Feb. 24, 2015

(54) GLOBAL CALIBRATION METHOD WITH APPARATUS BASED ON RIGID BAR FOR MULTI-SENSOR VISION

(75) Inventors: Guangjun Zhang, Beijing (CN); Zhen Liu, Beijing (CN); Zhenzhong Wei, Beijing (CN); Junhua Sun, Beijing (CN); Meng Xie, Beijing (CN)

(73) Assignee: Beihang University, Beijing (CN)

( * ) Notice: Subject to any disclaimer, the term of this patent is extended or adjusted under 35 U.S.C. 154(b) by 266 days.

(21) Appl. No.: 13/393,555

(22) PCT Filed: Aug. 9, 2011

(86) PCT No.: PCT/CN2011/078166
§ 371 (c)(1),
(2), (4) Date: Mar. 1, 2012

(87) PCT Pub. No.: WO2012/022231
PCT Pub. Date: Feb. 23, 2012

(65) Prior Publication Data
US 2012/0162414 A1 Jun. 28, 2012

(30) Foreign Application Priority Data
Aug. 20, 2010 (CN) .......................... 2010 1 0259481

(51) Int. Cl.
*H04N 7/18* (2006.01)
*G01C 25/00* (2006.01)
*G06T 7/00* (2006.01)

(52) U.S. Cl.
CPC ................ *G01C 25/00* (2013.01); *G06T 7/002* (2013.01); *G06T 2207/10012* (2013.01); *G06T 2207/30208* (2013.01)
USPC ........................................................ 348/139

(58) Field of Classification Search
USPC ........................................................ 348/139
See application file for complete search history.

(56) References Cited

U.S. PATENT DOCUMENTS 6,594,600 B1 * 7/2003 Arnoul et al. ................... 702/94
6,931,340 B2   8/2005 Jackson et al.
(Continued)

FOREIGN PATENT DOCUMENTS

CN    1096362 A    12/1994
CN    1464970 A    12/2003
(Continued)

OTHER PUBLICATIONS

International Search Report in international application No. PCT/CN2011/078166, mailed on Oct. 20, 2011.
(Continued)

*Primary Examiner* — Dave Czekaj
*Assistant Examiner* — Tracy Li
(74) *Attorney, Agent, or Firm* — Oppedahl Patent Law Firm LLC

(57) ABSTRACT

The present disclosure provides a global calibration method based on a rigid bar for a multi-sensor vision measurement system, comprising: step 1, executing the following procedure for at least nine times: placing, in front of two vision sensors to be calibrated, a rigid bar fasten with two targets respectively corresponding to the vision sensors; capturing images of the respective targets by their corresponding vision sensors; extracting coordinates of feature points of the respective targets in their corresponding images; and computing 3D coordinates of each feature points of the respective targets under their corresponding vision sensor coordinate frames; and Step 2, computing the transformation matrix between the two vision sensors, with the constraint of the fixed position relationship between the two targets. The present disclosure also provides a global calibration apparatus based on a rigid bar for a multi-sensor vision measurement system. Putting the present disclosure to use can increase the accuracy of the global calibration, and also be suitable for the calibration of the multi-sensor vision system in the extremely large working space, which enlarges the application range of the present disclosure.

10 Claims, 5 Drawing Sheets

(56) References Cited

U.S. PATENT DOCUMENTS

| | | | |
|---|---|---|---|
| 6,959,253 B2 | 10/2005 | Jackson et al. | |
| 6,968,282 B1 | 11/2005 | Jackson et al. | |
| 7,750,969 B2 | 7/2010 | Sato et al. | |
| 2003/0065466 A1 | 4/2003 | Jackson et al. | |
| 2003/0225536 A1 | 12/2003 | Jackson et al. | |
| 2004/0179205 A1* | 9/2004 | Van Den Bossche | 356/601 |
| 2007/0236561 A1* | 10/2007 | Anai et al. | 348/46 |
| 2008/0075324 A1 | 3/2008 | Sato et al. | |
| 2010/0017178 A1* | 1/2010 | Tsuk et al. | 703/6 |
| 2010/0268279 A1* | 10/2010 | Gabelberger et al. | 606/278 |

FOREIGN PATENT DOCUMENTS

| | | |
|---|---|---|
| CN | 101033963 A | 9/2007 |
| CN | 101261738 A | 9/2008 |
| CN | 101285676 A | 10/2008 |
| CN | 101975588 A | 2/2011 |
| WO | 2006009192 A1 | 1/2006 |

OTHER PUBLICATIONS

English Translation of the Written Opinion of the International Search Authority in international application No. PCT/CN2011/078166, mailed on Oct. 20, 2011.

Global Calibration of Multi-sensor Vision System Based on Two Planar Targets. Jul. 2009.

Zhengyou Zhang, A flexible new technique for camera calibration, IEEE Transactions on Pattern Analysis and Machine Intelligence, vol. 22, No. 11, Nov. 2000.

* cited by examiner (a)                          (b)

GLOBAL CALIBRATION METHOD WITH APPARATUS BASED ON RIGID BAR FOR MULTI-SENSOR VISION

TECHNICAL FIELD

The present disclosure relates to a global calibration technology for Multi-Sensor Vision Measurement Systems (MSVMSs), and more particularly, to a global calibration method with apparatus based on a rigid bar for MSVMSs.

BACKGROUND

Vision sensors are widely used due to their advantages of wide measurement range, non-contact character, high response speed, system flexibility and measuring accuracy, and so on. When we need to measure objects in a greater area, a plurality of vision sensors, each with a limited field of view, can be combined to construct a multi-vision sensor system, which allows a larger measuring range and yet a higher measuring accuracy. This kind of measurement system, as a rule, is referred to as "Multi-Sensor Vision Measurement System (MSVMS)."

Generally, in an MSVMS, sensors are placed far away from one another, because there is not any common field of view among them. As a result, global calibration has become a key factor in applying multiple vision sensors to measurements. To be specific, the position relationships among these sensors should be obtained and then unified under a single coordinate frame.

At present, there are three commonly used versions of global calibration method directed to an MSVMS: method based on homonymic coordinates unity, method based on intermediary coordinates unity, and method based on unique global coordinate unity. A specific explanation for these methods is provided as follows.

The method based on homonymic coordinates unity is to, for each of the multiple vision sensors, compute the rotation matrix and translate vectors from its local sensor frame to a global coordinate frame with a group of homonymic coordinates.

The method based on intermediary coordinates unity is to, for each sensor in the multiple sensor vision system, we unify its local coordinate frame into a global coordinate frame by concatenating transformations through several accessorial coordinate frames.

The method based on unique global coordinate unity is to carry out a local calibration for each of the multiple vision sensors in the system in a measuring condition, by directly using coordinates of feature points under one global coordinate frame, thus establishing a transformation from its local coordinate frame to the global coordinate frame.

The three above-mentioned methods, however, have one common disadvantage of their strongly relying on high-accuracy measuring equipments such as theodolite pairs, laser trackers and etc. However, there are "blind calibration areas" due to the limited working space and the intrinsic restrictions of the large measuring apparatus. Additional, these methods all need many times of coordinates transformations, which yields a decrease in the calibration accuracy.

In 2005, Zhang et al. propose a global calibration method based on planar targets. This method uses the fixed pose relationship between the feature points on the targets separately as a constraint to compute the transformation matrix between the two vision sensors of non-overlapping field of view, and it is also effective for the global calibration in wide area. More important, this method avoids vast computations on many times of coordinate transformations and yields higher calibration accuracy. However, it needs the planar target of huge size for the calibration. But using and machining such targets are so difficult that the global calibration method proposed by Zhang is not suitable for calibrating a multi-sensor vision measurement system of large working space.

SUMMARY

Accordingly, the main purpose of the present disclosure is to provide a global calibration method with the apparatus based on a rigid bar for a multi-sensor vision measurement system, which has a higher global calibration accuracy, and also applicable for the global calibration for a multi-sensor vision measurement system in a larger working space.

To achieve the above purpose, the present disclosure provides the following technical solutions.

The present disclosure provides a global calibration method with the apparatus based on a rigid bar for a multi-sensor vision measurement system, comprising:

Step 1, executing the following procedure for at least nine times: placing, in front of two vision sensors to be calibrated, a rigid bar fasten with two targets respectively corresponding to the vision sensors; capturing images of the respective targets by their corresponding vision sensors; extracting coordinates of the feature points of the respective targets on their corresponding images; and computing 3D coordinates of each feature points of the respective targets under their corresponding vision sensor coordinate frames; and Step 2, computing the transformation matrix between the two vision sensors, by the constraint of the fixed position relationship between the two targets.

In the solution above, the method may further comprise: before executing step 1, fixing the targets onto the rigid bar, adjusting the length of the rigid bar and positions of the targets so that the images of the respective targets can be captured by their corresponding vision sensors clearly.

In the solutions above, the multi-sensor vision measurement system may include more than two vision sensors, and for each execution of step 1, the method may further comprise: selecting optionally two vision sensors to be calibrated; and capturing clear images of their corresponding targets at the same time.

In the solutions above, the method may further comprise: after capturing the images of the respective targets by their corresponding vision sensors, correcting the distortion of the images of the targets according to the intrinsic parameters calibrated of the corresponding vision sensors.

In the solutions above, computing the transformation matrix between the two vision sensors may include: computing the rotation matrix and translation vectors; establishing an objective function on the basis of minimizing the re-projection error; solving an non-linear optimal solution for the rotation matrix and translation vectors to acquire the transformation matrix between the two vision sensors, by using a non-linear optimization approach.

In the solutions above, the targets are fastened onto the rigid bar through clamp holders, universal couplings and connecting fixators for the rigid bar.

The present disclosure also provides a global calibration apparatus based on a rigid bar for calibrating a multi-sensor vision measurement system, including a rigid bar with an adjustable length, two targets, two clamp holders for holding the targets, two universal couplings, and connecting fixators for the rigid bar, wherein, the rigid bar further includes a hollow bar and two solid bars covered by the hollow bar and fastened to the hollow bar with bolts; the targets are fastened by the clamp holders for holding the targets, the clamp holders equipped with the targets are arranged on the universal couplings to enable the targets to rotate any degree around the universal couplings; the universal couplings are fastened onto the two solid bars respectively by the connecting fixators for the rigid bar.

In the above solution, the number of the targets, the clamp holders, the universal couplings and the connecting fixators for the rigid bar, each is two.

In the global calibration method with apparatus based on a rigid bar for a multi-sensor vision measurement system provided by the present disclosure, two targets are fasten onto the rigid bar, the length of the rigid bar and the positions of the targets are adjusted, the transformation matrix between the two sensors are obtained by using the fixed position relationship between the two targets as a constraint. The global calibration for a multi-sensor vision measurement system of more than two sensors can be realized by repeating the above pair-wise calibration on different pairs of vision sensor. The method provided by the present disclosure has a flexible and diverse use in practical applications; it is convenient for that the length of the rigid bar is adjustable according to the different distributions of the vision sensors, yielding that the two vision sensors are able to capture images of the targets clearly at the same time, and this factor is very significant in promising the final calibration accuracy. Additional, the calibration method proposed here is effective in the condition of extremely large working space, so it has a wider application range. Further, the calibration accuracy of the method is higher.

DETAILED DESCRIPTION

The basic idea of the present disclosure is firstly to execute the following procedure for at least nine times: placing, in front of two vision sensors to be calibrated, a rigid bar fasten with two targets respectively corresponding to the vision sensors; capturing images of the two targets by their corresponding vision sensors; extracting the coordinates of the feature points on the images of the targets, respectively; and computing the 3D coordinates of the feature points on the targets under the coordinate frame of their corresponding vision sensor, respectively. And then to compute the transformation matrix between the two vision sensors, with the constraint of the fixed position relationship between the two targets.

Here, since the targets are fastened onto the rigid bar, when we mention placing the rigid bar at a different position or moving the position of the rigid bar, it means that the positions of the targets are changed or the targets are moved.

Moreover, the positions of the two targets fastened onto the rigid bar should be properly adjusted before the beginning of the global calibration. Specifically, firstly we need to fix the two targets onto the rigid bar, and then to adjust the length of the rigid bar as well as the positions of the targets to ensure that the images of the targets can be captured clearly by the two vision sensors. During the whole global calibration, the position relationship between the two targets keeps unchanged. In particular, the locations and orientations of the targets with respect to the rigid bar do not further change, and only the movement of the rigid bar itself can make the targets move to different places with respect to the vision sensors.

When there are more than two vision sensors in the system, an approach of calibrating every two sensors at a time can be adopted. This approach, specifically, is to, for every time, optionally select two vision sensors among all the sensors in the system as the to-be-calibrated pair. With this approach, a global calibration for the MSVMS can be performed.

Figure 1:
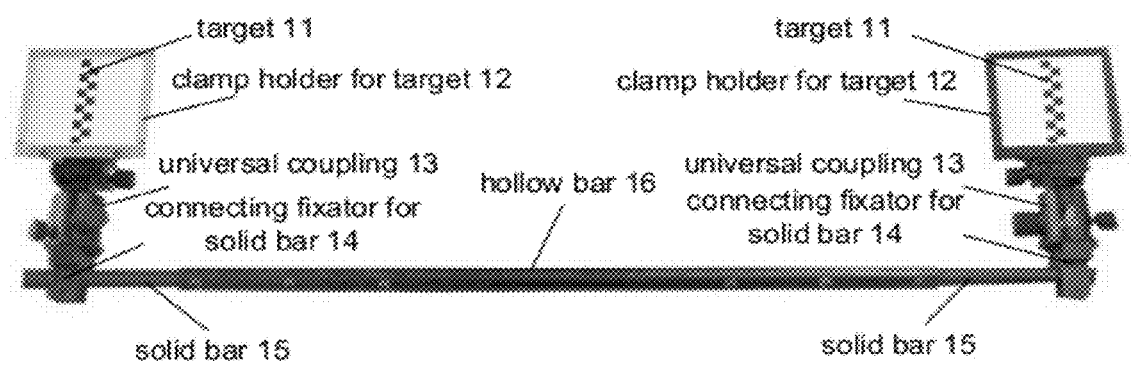
FIG. 1 illustrates the structure of the global calibration apparatus based on a rigid bar for calibrating the multi-sensor vision measurement system used in the present disclosure.

The global calibration apparatus based on a rigid bar for a multi-sensor vision measurement system according to the present disclosure, as illustrated in FIG. 1, includes the two targets 11, two clamp holders 12 for holding the two targets respectively, two universal couplings 13, two connecting fixators 14, and a retractable rigid bar, wherein the rigid bar comprises two solid bars 15 and a hollow bar 16. The main role of the global calibration apparatus is to assist the vision sensors to perform a global calibration. The apparatus, as described here, has the key features as follows:

a1) the two targets 11 have a known size, and they are fastened by the two clamp holders 12, respectively. In FIG. 1, the center of the chessboard corners at the two lines in black and white check are the feature points of the targets;

a2) the two clamp holders 12 with the targets 11 on them are set up on the two universal couplings 13, so the two targets 11 can rotate to any degree by the universal couplings 13;

a3) the rigid bars are composed of one hollow bar 16 and two solid bars 15 which are covered by the hollow one. The two solid bars 15 can move freely inside the hollow bar 16, so the length of the rigid bar is adjustable. The two solid bars 15 and the hollow bar 16 are interactively connected by bolts;

a4) the two universal couplings 13 are fastened at the ends of the solid bars 15 respectively by the connecting fixators 14 for the rigid bar.

a5) the procedures of the global calibration is, placing the assembled target in front of the two vision sensors to be calibrated, moving the two solid bars 15 inside the hollow bar 16, to ensure that the vision sensors can capture the images of the targets 11 at the same time. When the appropriate length for the solid bars 15 is found, they are fastened with the hollow bar 16 by bolts. Then adjust the two universal couplings 13 respectively to change the orientations of the two targets, so that the targets can be shot at an optimal place. Here, the mentioned targets can refer to 1D targets, and in the following part, we use the 1D targets as an example to illustrate the global calibration.

Based on the apparatus shown in FIG. 1 for the global calibration, the present disclosure additional provides a corresponding global calibration method based on the apparatus proposed, and the method provided has the following key features:

b1) the two vision sensors capture the images of their corresponding 1D targets respectively, and then the image coordinates of the feature points on the targets can be extracted. For the intrinsic parameters of the two sensors have been obtained from the camera calibration previously, the distortion of the above feature points on the images can be corrected. Here, the procedure of the distortion correction is: according to the intrinsic parameters of the camera, using the method proposed by Zhang Z Y. in "A flexible new technique for camera calibration [J], IEEE Trans. on Pattern Analysis and Machine Intelligence", to correct the image distortion caused by the lens distortion of the camera;

b2) by the known image coordinates of the above feature points and the theory of cross-ratio invariance, compute the image coordinates of the infinite point of the line, on which the line of the 1D target in 3D space lies. Here, the image of the infinite point mentioned is the vanish point, and there are in all two vanish points to be computed on the left and right images.

b3) according to the image coordinates of the vanish points, and the known intrinsic parameters of the sensors, compute the 3D coordinates of the feature points in the local coordinate frames of their corresponding vision sensors, respectively.

b4) the assembled target with the feature points on it is placed optionally in the view range of the two sensors for no less than 9 times. Taking the fixed position relationship of the two 1D targets in the moving process as a constraint, solve the transformation matrix between the two sensors.

b5) using a non-linear optimization approach to obtain a more accurate solution of the transformation matrix between the two sensors.

b6) the global calibration for a multi-sensor vision system can be implemented by calibrating every two vision sensors at a time.

Figure 2:
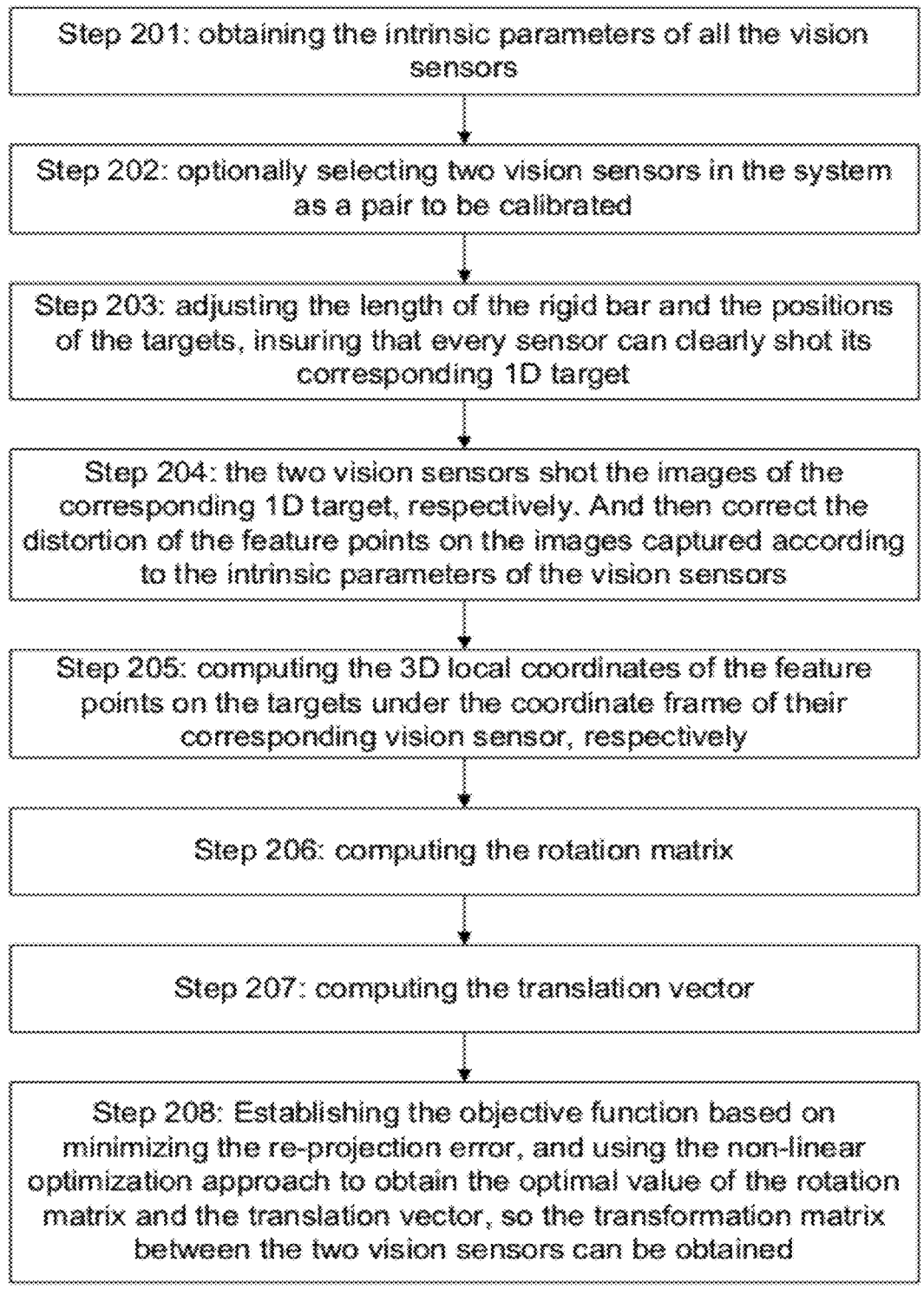
FIG. 2 illustrates the flow diagram of the global calibration method based on a rigid bar for calibrating the multi-sensor vision measurement system according to the present disclosure.

Details about the global calibration method based on the rigid bar for the multi-sensor vision system are as follows. As FIG. 2 shows, the method includes the following steps:

Step 201: obtaining the intrinsic parameters of all the vision sensors.

Here, the details of the algorithm can refer to the camera calibration method proposed by ZHANG Z Y. in "A flexible new technique for camera calibration [J], IEEE Trans. on Pattern Analysis and Machine Intelligence".

Step 202: optionally selecting two vision sensors in the system as a pair to be calibrated.

Here, the selected two vision sensors is called vision sensor 1 and vision sensor 2, which are correspond to the two pre-set 1D targets on the rigid bar—1D target 1 and 1D target 2, respectively.

Here, fastening the targets on the rigid bar is to fix the two 1D targets on the universal couplings, and the universal couplings are fixed on the rigid bar by the connecting fixators.

Step 203: adjusting the length of the rigid bar and the positions of the targets, insuring that every sensor can clearly shot its corresponding 1D target.

More specifically, we need to adjust the length of the rigid bar, insuring that the two 1D targets are in the field view of the two sensors, respectively. Then adjust the positions of the targets, insuring that each sensor is able to shot its corresponding 1D target clearly. Here, besides adjusting the length of the rigid bar, we also need to tight the bolts connecting the hollow bar and the solid bars, so that the length of the rigid bar is unchangeable. The mentioned insuring that the two 1D targets are in the field view of the two sensors means: enabling that the two vision sensors can capture the images of their corresponding 1D targets clearly at the same time; the mentioned adjusting the positions of the targets means: adjusting the orientations of the two 1D targets set on the universal couplings, respectively.

Figure 3:
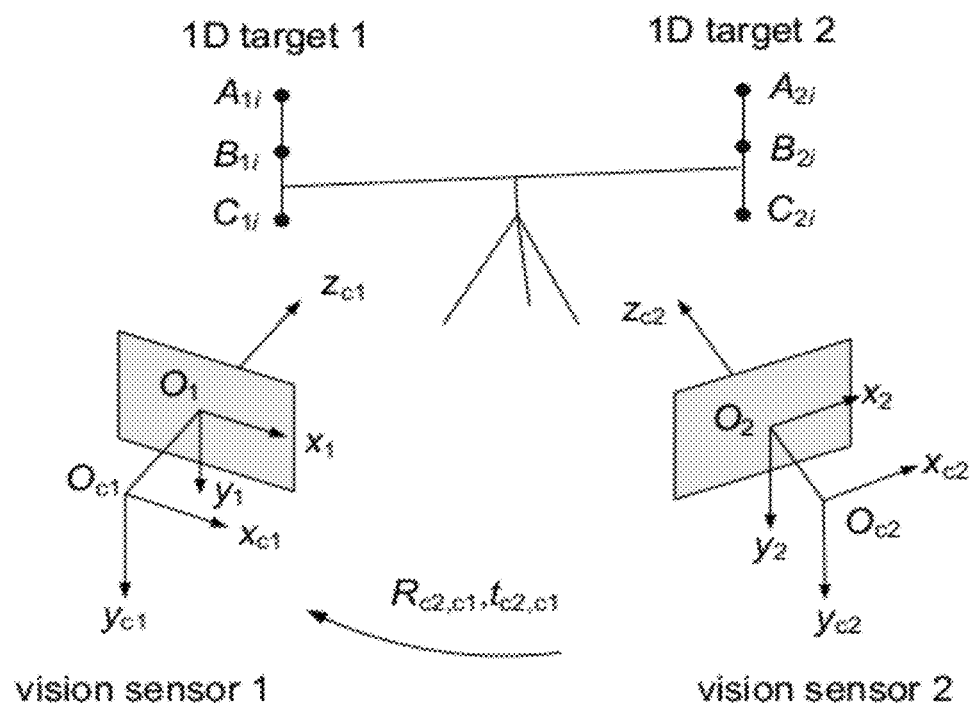
FIG. 3 illustrates the principle of a global calibration method based on a rigid bar for calibrating the multi-sensor vision measurement system according to the present disclosure.

FIG. 3 illustrates the principle of a global calibration method based on a rigid bar for a multi-sensor vision system according to the present disclosure. As shown in FIG. 3, the vision sensor 1 and vision sensor 2 correspond to the 1D target 1 and 1D target 2, respectively. Vision sensor 1 can "see" the whole of the 1D target 1, but cannot "see" any part of the 1D target 2; vision sensor 2 can "see" the whole of the 1D target 2, but it cannot "see" any part of the 1D target 1.

Set $Oc1$-$xc1yc1zc1$ to be the coordinate frame of the vision sensors 1, $Oc2$-$xc2yc2zc2$ to be the coordinate frame of the vision sensors 2, $O1$-$x1y1$ to be the image coordinate frame of the vision sensor 1, $O2$-$x2y2$ to be the image coordinate frame of the vision sensor 2, $Rc2,c1,tc2,c1$ to be the rotation matrix and the translation vectors from the coordinate frame of the vision sensor 2 to that of the vision sensor 1. $A1i$, $B1i$, $C1i$ represent for the 3D coordinates of the feature points on the target 1 when the assembled target is placed at the ith location; and $A2i$, $B2i$, $C2i$ represent for the 3D coordinates of the feature points on the target 2 when the assembled target is placed at the ith location.

In the above steps 201-203, the mentioned steps of the calibration of vision sensors for obtaining the intrinsic parameters, selecting the vision sensors, and adjusting the length of the rigid bar and positions of the targets have been all executed before the global calibration.

Step 204: the two vision sensors shot the images of the corresponding 1D target, respectively. And then correct the distortion of the feature points on the images captured according to the intrinsic parameters of the vision sensors.

Step 205: computing the 3D local coordinates of the feature points on the targets under the coordinate frame of their corresponding vision sensor, respectively.

Take the solution of the vision sensor 1 as an illustration. On the target images captured by the vision sensor 1, the image coordinates of three or more feature points on the 1D target 1 are used to obtain the image coordinates of the point $v1i$, which is the vanish point of the line that the 1D target 1 lies on.

Supposing that $V\infty i$ is the vanish point of the line that the 1D target 1 lies on at the ith location during the moving of the assemble target. Because $V\infty i$ is the vanish point, the approximation of $A1iV\infty i/B1iV\infty i$ is 1, so the cross-ratio equation of the four points $A1i$, $B1i$, $C1i$ and $V\infty i$ can be described as Eq. (1):

$$CR(A_{1i},B_{1i},C_{1i},V_{\infty i})=A_{1i}C_{1i}/B_{1i}C_{1i}\cdot A_{1i}V_{\infty i}/B_{1i}V_{\infty i}\approx A_{1i}C_{1i}/B_{1i}C_{1i} \quad (1)$$

The cross-ratio is an invariant, so $v1i$ can be solved from Eq. (2):

$$CR(A_{1i},B_{1i},C_{1i},V_{\infty i})=CR(a_{1i},b_{1i},c_{1i},d_{1i})\approx A_{1i}C_{1i}/B_{1i}C_{1i} \quad (2)$$

Where $a1i$, $b1i$ and $c1i$ represent for the image coordinates of the projected points $A1i$, $B1i$ and $C1i$ respectively on the image plane of vision sensor 1, when the assembled target is placed at the ith location.

For the property of the vanish points, the direction of the line $\overline{A_{1i}C_{1i}}$ in space is parallel to the direction of $K_1^{-1}v_{1i}$, the reverse projection line of the vanish point $v1i$, so the following equation stands:

$$(C_{1i}-A_{1i}) \times K_1^{-1}v_{1i}=0 \quad (3)$$

In Eq. (3), $K1$ is the intrinsic parameter matrix of the vision sensor 1, and the solving process of the intrinsic parameters can refer to the paper "A flexible new technique for camera calibration [J], IEEE Trans. on Pattern Analysis and Machine Intelligence".

The distance between A1$i$ and C1$i$ is known as $L_{ac}$, so:

$$\|C_{1i} - A_{1i}\| = L_{ac} \qquad (4)$$

According to the projection model of the camera, we have:

$$\begin{cases} \rho_1 a_{1i} = K_1 A_{1i} \\ \rho_2 c_{1i} = K_2 C_{1i} \end{cases} \qquad (5)$$

$\rho^1$ and $\rho^2$ are the scale factors, K2 is the intrinsic parameter matrix of vision sensor 2.

Based on Eq. (4) and Eq. (5), the value of A1$i$ and C1$i$ can be computed. According to the co-linearity property of the feature points on the 1D target, the 3D local coordinates of all the feature points on the target 1 under the coordinate frame of the vision sensor 1 can be solved, which are denoted as A1$i$, B1$i$ and C1$i$.

Similarly, the 3D local coordinates of all the feature points on the target 2 under the coordinate frame of the vision sensor 2 can be solved also, which are denoted as A2$i$, B2$i$ and C2$i$.

Step 206: computing the rotation matrix Rc2,c1.

Assuming that the assembled target is placed at the ith (i=1 ... n) place, $\vec{n}_1$, $\vec{n}_2$ denote the direction vector of the target 1 and target 2 under the coordinate frame of their corresponding vision sensor, respectively. According to the property of the fixed position relationship between the two 1D targets, Eq. (6) stands:

$$\vec{n}_{1i} \cdot (R_{c2,c1} \vec{n}_{2i}) = \vec{n}_{1j} \cdot (R_{c2,c1} \vec{n}_{2j}) \qquad (6)$$

Every two placements of the target yield a constraint as (6), and based on Eq. (6) as well as the property of the rotation matrix, we know that no less than three equations as (6) can yield the solution of Rc2,c1, so the rigid bar with the two 1D targets on them should be placed at no less than 9 locations. Here, the property of the rotation matrix is: the three column vectors of the rotation matrix are all unit vectors, and every two of them are mutually orthogonal, so the degree of freedom (DOF) of the rotation matrix is 3.

Step 207: computing the translation vector t c2,c1.

Assuming that the assembled target is put at the ith place, and $\tilde{A}_{2i}$, $\tilde{B}_{2i}$ and $\tilde{C}_{2i}$ denote the 3D local coordinates of the feature points on the target 2 under the coordinate frame of vision sensor 2, and the transformation between them are shown in Eq. (7):

$$\begin{cases} \tilde{A}_{2i} = R_{c2,c1} A_{2i} + t_{c2,c1} \\ \tilde{B}_{2i} = R_{c2,c1} B_{2i} + t_{c2,c1} \\ \tilde{C}_{2i} = R_{c2,c1} C_{2i} + t_{c2,c1} \end{cases} \qquad (7)$$

Considering that in the moving process of the assembled target, the position relationship between the two 1D targets is unchanged, so the distance between any two feature points on the two targets respectively are unchanged as well. Hence, the following equations stand:

$$\begin{cases} d^2(A_{1i}, \tilde{A}_{2i}) = d^2(A_{1j}, \tilde{A}_{2j}) \\ d^2(B_{1i}, \tilde{B}_{2i}) = d^2(B_{1j}, \tilde{B}_{2j}) \\ d^2(C_{1i}, \tilde{C}_{2i}) = d^2(C_{1j}, \tilde{C}_{2j}) \end{cases} \qquad (8)$$

Decompose Eq. (8) and eliminate the quadratic terms of the components of t c2,c1, so the value of t c2,c1 can be obtained.

Step 208: Establishing the objective function based on minimizing the re-projection error, and using the non-linear optimization approach to obtain the optimal value of Rc2,c1, t c2,c1, so the transformation matrix between the two vision sensors can be obtained.

Here, the aim of establishing the objective function is to assist the optimization, in other words, the aim of the non-linear optimization is that the function can reach its smallest value after the optimization, and the value of Rc2,c1 and t c2,c1 yielding the smallest value of the function can be obtained.

Figure 4:
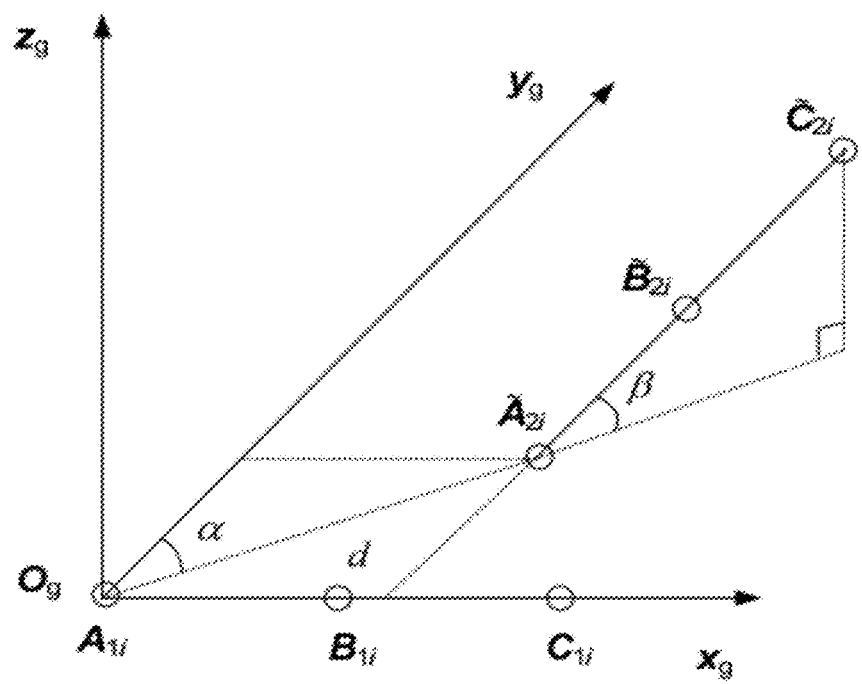
FIG. 4 illustrates coordinate frames set on a rigid bar according to the present disclosure.

In FIG. 4, Og-xgygzg is the coordinate frame set on the rigid bar. The way to establish the coordinate frame of the rigid bar is: choosing one placement of the target optionally, setting A1$i$ on the 1D target 1 to be the original point of the coordinate frame, and the line on which target 1 lies to be the x axis, the normal direction of the plane on which A1$i$, C1$i$ and $\tilde{A}_{2i}$ lie to be the z axis. In FIG. 4, $\alpha$ is the angle contained by y axis and the projection line of the 1D target 2 on the plane Og-xgyg, $\beta$ is the angle contained by the 1D target 2 and the plane Og-xgyg, d is the distance between $\tilde{A}_{2i}$ on target 2 and A1$i$ on target 1.

The 3D coordinates of the feature points on target 2 under the coordinate frame of the rigid bar can be computed by (9):

$$\begin{cases} \hat{A}_{2i} = [d\sin(\alpha) \quad d\cos(\alpha) \quad 0 \quad 1]^T \\ \hat{B}_{2i} = [\sin(\alpha)(L_{A_2B_2}\cos(\beta)+d) \quad \cos(\alpha)(L_{A_2B_2}\cos(\beta)+d) \quad L_{A_2B_2}\sin(\beta) \quad 1]^T \\ \hat{C}_{2i} = [\sin(\alpha)(L_{A_2C_2}\cos(\beta)+d) \quad \cos(\alpha)(L_{A_2C_2}\cos(\beta)+d) \quad L_{A_2C_2}\sin(\beta) \quad 1]^T \end{cases} \qquad (9)$$

In Eq. (9), $L_{A_2B_2}$ and $L_{A_2C_2}$ denote the distance of A2B2 and A2C2, respectively, thereinto, $\alpha$, $\beta$ and d can be solved according to the value of A1$i$, B1$i$, C1$i$, $\tilde{A}_{2i}$, $\tilde{B}_{2i}$ and $\tilde{C}_{2i}$.

The 3D coordinates of the feature points on the target 1 under the coordinate frame of the rigid bar are:

$$\begin{cases} \hat{A}_{1i} = [0 \quad 0 \quad 0 \quad 1]^T \\ \hat{B}_{1i} = [L_{A_1B_1} \quad 0 \quad 0 \quad 1]^T \\ \hat{C}_{1i} = [L_{A_1C_1} \quad 0 \quad 0 \quad 1]^T \end{cases} \qquad (10)$$

In Eq. (10), $L_{A_1B_1}$ and $L_{A_1C_1}$ denote the distance of A1B1 and A1C1, respectively; when the assembled target is placed at the ith place, the transformation matrix from the coordinate frame of vision sensor 1 to the coordinate frame of the rigid bar can be solved out by Eq. (11):

$$[A_{1i} C_{1i} \tilde{A}_{2i}] = T_{gi,c1} [\hat{A}_{1i} \hat{C}_{1i} \hat{A}_{2i}] \qquad (11)$$

Suppose that $\hat{a}_{1i}$, $\hat{b}_{1i}$ and $\hat{c}_{1i}$ are the image coordinates of the feature points of the target 1 on the image plane of the vision sensor 1. The specific description of the transformations is:

$$\begin{cases} \rho_1 \hat{a}_{1i} = K_1[\ I_{3\times 1}\ \ 0_{3\times 1}\ ]T_{gi,c1}\hat{A}_{1i} \\ \rho_2 \hat{b}_{1i} = K_1[\ I_{3\times 1}\ \ 0_{3\times 1}\ ]T_{gi,c1}\hat{B}_{1i} \\ \rho_3 \hat{c}_{1i} = K_1[\ I_{3\times 1}\ \ 0_{3\times 1}\ ]T_{gi,c1}\hat{C}_{1i} \end{cases} \quad (12)$$

In Eq. (12), $\rho_1$, $\rho_2$ and $\rho_3$ are scale factors, K1 is the intrinsic parameter matrix of the vision sensor 1.

Let $\hat{a}_{2i}$, $\hat{b}_{2i}$ and $\hat{c}_{2i}$ denote the image coordinates of the feature points of the target 2 on the image plane of the vision sensor 1. The specific description of the transformations is:

$$\begin{cases} s_1 \hat{a}_{2i} = K_2[\ I_{3\times 1}\ \ 0_{3\times 1}\ ]T_{c2,c1}^{-1}T_{gi,c1}\hat{A}_{2i} \\ s_2 \hat{b}_{2i} = K_2[\ I_{3\times 1}\ \ 0_{3\times 1}\ ]T_{c2,c1}^{-1}T_{gi,c1}\hat{B}_{2i} \\ s_3 \hat{c}_{2i} = K_2[\ I_{3\times 1}\ \ 0_{3\times 1}\ ]T_{c2,c1}^{-1}T_{gi,c1}\hat{C}_{2i} \end{cases} \quad (13)$$

In Eq. (12), K2 is the intrinsic parameter matrix of the vision sensor 2, $$T_{c2,c1} = \begin{bmatrix} R_{c2,c1} & t_{c2,c1} \\ 0^T & 1 \end{bmatrix},$$

s1, s2 and s2 are scale factors.

Establish the objective function based on minimizing the re-projection error, as Eq. (14) shows:

$$f(a) = \sum_{i=1}^{n}\left(d^2(a_{1i},\hat{a}_{1i}) + d^2(b_{1i},\hat{b}_{1i}) + d^2(c_{1i},\hat{c}_{1i})\right) + \sum_{i=1}^{n}\left(d^2(a_{2i},\hat{a}_{2i}) + d^2(b_{2i},\hat{b}_{2i}) + d^2(c_{2i},\hat{c}_{2i})\right) \quad (14)$$

Where, $a=(T_{c2,c1}, T_{gi,c1}, d, \alpha, \beta)$.

The maximum likelihood estimate of Rc2,t2 and tc2,t2 can be obtained by minimizing Eq. (14) using the nonlinear optimization method (as LM method).

An embodiment:

In this embodiment here, the multi-sensor vision system to be calibrated consists of two vision sensors—vision sensor 1 and 2. The two sensors are both Aigo digital cameras with 23 mm Schneider lens, and the other parameters are also the same. The image resolution of the two vision sensors is 1280 pixel×1024 pixel, the working distance is about 750 mm, and the field of view is about 150 mm×120 mm.

The intrinsic parameter of each vision sensor has been calibrated by Zhang's method in "A flexible new technique for camera calibration [J], IEEE Trans. on Pattern Analysis and Machine Intelligence". Table 1 shows the calibration results of the two vision sensors.

TABLE 1

| Intrinsic parameter | Vision sensor 1 | Vision sensor 2 |
|---|---|---|
| fx | 4418.631 | 4404.020 |
| fy | 4418.780 | 4404.012 |
| γ | 0.309 | −0.616 |
| u0 | 622.862 | 648.506 |
| v0 | 393.535 | 438.138 |
| k1 | −0.209 | −0.211 |
| k2 | 0.763 | 0.730 |

Figure 5:
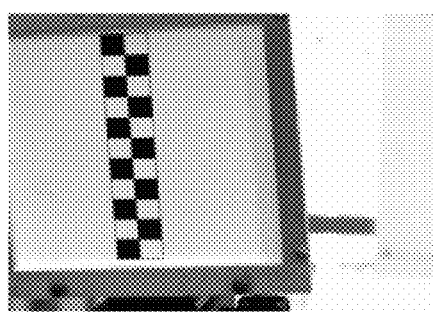
FIG. 5 illustrates images of the 1D targets captured by vision sensors according to an example of the present disclosure.
Figure 5:
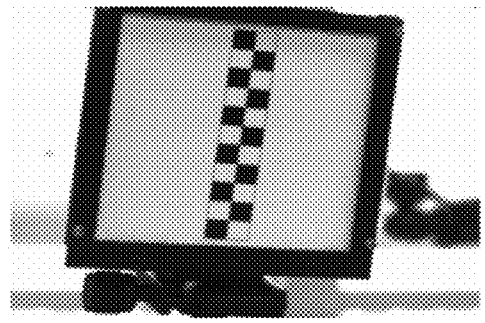

FIG. 5 shows images of target 1 and target 2 captured by the vision sensor 1 and vision sensor 2, respectively; thereinto, FIG. 5 (*a*) shows the images of the 1D target 1 captured by the vision sensor 1, and FIG. 5 (*b*) shows the images of the 1D target 2 captured by the vision sensor 2. Using the global calibration method proposed in the present disclosure as FIG. 2) shows, the transformation matrix Tc2,c1 between the two vision sensors computed is:

$$T_{c2,c1} = \begin{bmatrix} -0.9289 & -0.2954 & -0.2235 & 389.912 \\ -0.3150 & 0.3122 & 0.8963 & 340.585 \\ -0.1950 & 0.9029 & -0.3830 & -354.547 \\ 0 & 0 & 0 & 1 \end{bmatrix}$$

In order to evaluate the accuracy of the global calibration method present in the present disclosure, we take the distances between feature points on the two 1D targets respectively as the standard length to be measured, and take the value measured by the stereo-vision sensor as the ground truth. Based on the transformation matrix Tc2,c1 obtained by the method in the present disclosure and Eq. (5), the 3D coordinates of the feature points of the target 2 under the coordinate frame of the vision sensor 1 can be reconstructed, thus the distance between any two feature points on the two 1D targets respectively can be computed, called the measured distances. Randomly select 7 point-pairs, and the RMS error (RMS, Root Mean Square) of the 7 point-pairs is computed on the basis of the measured distances and ground truth, and the RMS error is to be used as the evaluation of the global calibration accuracy.

TABLE 2

| Point pair index | Measured distance | Ground truth | Deviation |
|---|---|---|---|
| 1 | 1340.089 | 1340.052 | 0.037 |
| 2 | 1332.656 | 1332.801 | −0.145 |
| 3 | 1325.307 | 1325.189 | 0.117 |
| 4 | 1318.043 | 1318.479 | −0.436 |
| 5 | 1310.866 | 1310.839 | 0.027 |
| 6 | 1303.778 | 1303.800 | −0.022 |
| 7 | 1296.780 | 1296.992 | −0.213 |
|  |  | RMS Error | 0.197 |

The RMS error of the distances between seven point pairs is shown in TAB. 2, so it proves that the global calibration method present in the present disclosure can reach a global calibration accuracy of better than 0.1 ‰.

The foregoing description of various embodiments of the present disclosure has been presented for purposes of illustration and description. It is not intended to be exhaustive or to limit the present disclosure to the precise embodiments disclosed. Numerous modifications or variations are possible in light of the above teaching.

What is claimed is:

1. A global calibration method based on a rigid bar for a multi-sensor vision measurement system, comprising:
    step 1, executing the following for at least nine times:
        placing, in front of two vision sensors to be calibrated, a rigid bar fasten with two targets respectively corresponding to the vision sensors;

capturing images of the respective targets by their corresponding vision sensors;

extracting coordinates of feature points of the respective targets in their corresponding images; and computing 3D coordinates of each feature points of the respective targets under their corresponding vision sensor coordinate frames; and step 2, computing the transformation matrix between the two vision sensors, with the constraint of the fixed position relationship between the two targets, wherein computing the transformation matrix between the two vision sensors includes:

computing a rotation matrix and translation vectors;

establishing an objective function on the basis of minimizing re-projection error;

solving an non-linear optimal solution for the rotation matrix and translation vectors to acquire the transformation matrix between the two vision sensors, by using a non-linear optimization approach.

2. The method according to claim 1, wherein the targets are fasten onto the rigid bar through clamp holders, universal couplings and connecting fixators for the rigid bar.

3. The method according to claim 1, further comprising: before executing step 1, fixing the targets onto the rigid bar, and adjusting the length of the rigid bar and positions of the targets so that clear images of the respective targets can be captured by their corresponding vision sensors to be calibrated.

4. The method according to claim 3, wherein the targets are fasten onto the rigid bar through clamp holders, universal couplings and connecting fixators for the rigid bar.

5. The method according to claim 1, wherein the multi-sensor vision measurement system includes more than two vision sensors, and for each execution of step 1, the method further comprises:

selecting optionally two vision sensors, respectively corresponding to the targets, to be calibrated; and capturing clear images of the respective targets by their corresponding vision sensors.

6. The method according to claim 5, wherein the targets are fasten onto the rigid bar through clamp holders, universal couplings and connecting fixators for the rigid bar.

7. The method according to claim 1, further comprising: after capturing the images of the respective targets by the corresponding vision sensors, correcting the distortion of the respective target images by the corresponding vision sensors according to the intrinsic parameters calibration results of the corresponding vision sensors.

8. The method according to claim 7, wherein the targets are fasten onto the rigid bar through clamp holders, universal couplings and connecting fixators for the rigid bar.

9. A global calibration apparatus based on a rigid bar for a multi-sensor vision measurement system, comprising a rigid bar with an adjustable length, targets, clamp holders for holding the targets, universal couplings, and connecting fixators for the rigid bar, wherein, the rigid bar further includes a hollow bar and two solid bars covered by the hollow bar and fastened to the hollow bar with bolts;

the targets are fastened by the clamp holders for holding the targets, the clamp holders equipped with the targets are arranged on the universal couplings to enable the targets to rotate any degree around the universal couplings;

the universal couplings are fastened onto the two solid bars respectively by the connecting fixators for the rigid bar, wherein the apparatus further comprises two vision sensors configured to capture images of the respective targets by their corresponding vision sensors, to extract coordinates of feature points of the respective targets in their corresponding images, to compute 3D coordinates of each feature points of the respective targets under their corresponding vision sensor coordinate frames; and to compute the transformation matrix between the two vision sensors, with the constraint of the fixed position relationship between the two targets, wherein compute the transformation matrix between the two vision sensors includes:

computing a rotation matrix and translation vectors;

establishing an objective function on the basis of minimizing re-projection error;

solving an non-linear optimal solution for the rotation matrix and translation vectors to acquire the transformation matrix between the two vision sensors, by using a non-linear optimization approach.

10. The apparatus according to claim 9, wherein the number of the targets, the clamp holders, the universal couplings and the connecting fixators for the rigid bar, each is just two.

\* \* \* \* \*